US012695099B2

(12) United States Patent
O'Sullivan et al.

(10) Patent No.: US 12,695,099 B2
(45) Date of Patent: Jul. 28, 2026

(54) CATALYST-COATED MEMBRANE AND METHOD OF MANUFACTURE

(71) Applicant: JOHNSON MATTHEY HYDROGEN TECHNOLOGIES LIMITED, London (GB)

(72) Inventors: Julie O'Sullivan, Swindon (GB); Peter Trew, Swindon (GB)

(73) Assignee: Johnson Matthey Hydrogen Technologies Limited, London (GB)

( * ) Notice: Subject to any disclaimer, the term of this patent is extended or adjusted under 35 U.S.C. 154(b) by 285 days.

(21) Appl. No.: 18/554,649

(22) PCT Filed: May 26, 2022

(86) PCT No.: PCT/GB2022/051340
§ 371 (c)(1),
(2) Date: Oct. 10, 2023

(87) PCT Pub. No.: WO2022/248864
PCT Pub. Date: Dec. 1, 2022

(65) Prior Publication Data
US 2024/0372111 A1    Nov. 7, 2024

(30) Foreign Application Priority Data

May 26, 2021    (GB) ..................................... 2107506

(51) Int. Cl.
H01M 4/88 (2006.01)
C25B 9/23 (2021.01)
(Continued)

(52) U.S. Cl.
CPC ............. H01M 4/8832 (2013.01); C25B 9/23 (2021.01); H01M 4/8882 (2013.01);
(Continued)

(58) Field of Classification Search
CPC ............. H01M 4/8832; H01M 4/8882; H01M 4/8896; H01M 8/1004; H01M 2008/1095;
(Continued)

(56) References Cited

U.S. PATENT DOCUMENTS

| | | | | |
|---|---|---|---|---|
| 2005/0281981 A1* | 12/2005 | Puffer | ................. | H01M 8/0273 |
| | | | | 428/137 |
| 2008/0090131 A1* | 4/2008 | de Rouffignac | .... | H01M 8/0286 |
| | | | | 156/60 |
| 2010/0038020 A1* | 2/2010 | Hori | .................... | H01M 8/0273 |
| | | | | 156/196 |

FOREIGN PATENT DOCUMENTS

| | | |
|---|---|---|
| EP | 2779289 A1 | 9/2014 |
| JP | 2006-244930 A | 9/2006 |

(Continued)

*Primary Examiner* — Christopher W Raimund
(74) *Attorney, Agent, or Firm* — BakerHostetler

(57) ABSTRACT

Provided is a method of manufacturing a catalyst-coated ion-conducting membrane for an electrochemical cell, the method comprising: providing an ion-conducting membrane, an electrocatalyst layer, and a masking layer between the ion-conducting membrane and the electrocatalyst layer, wherein the masking layer comprises one or more aperture(s) to provide one or more exposed region(s) and one or more non-exposed region(s) of the electrocatalyst layer; and contacting the layers such that the one or more exposed region(s) of the electrocatalyst layer are transferred onto the ion-conducting membrane and the masking layer prevents the one or more non-exposed region(s) of the electrocatalyst layer from being transferred onto the ion-conducting membrane.

34 Claims, 8 Drawing Sheets

(51) Int. Cl.
H01M 8/10 (2016.01)
H01M 8/1004 (2016.01)

(52) U.S. Cl.
CPC ....... H01M 4/8896 (2013.01); H01M 8/1004 (2013.01); *H01M 2008/1095* (2013.01)

(58) Field of Classification Search
CPC ............. H01M 4/8814; H01M 4/8825; H01M 4/8875; H01M 8/0286; C25B 9/23; Y02E 60/50
See application file for complete search history.

(56) References Cited

FOREIGN PATENT DOCUMENTS

| | | | | |
|---|---|---|---|---|
| JP | 2006339022 | A | * | 12/2006 |
| WO | 2006/032894 | A2 | | 3/2006 |
| WO | 2007/043809 | A1 | | 4/2007 |
| WO | 2015/145129 | A1 | | 10/2015 |

* cited by examiner

100

4

2

6

10

8

100

10

4

8

16

2

12

6

14

CATALYST-COATED MEMBRANE AND METHOD OF MANUFACTURE

FIELD OF THE INVENTION

The present disclosure relates to components for electrochemical cells and methods of manufacturing components for electrochemical cells. In particular, the present disclosure relates to a masked electrocatalyst component and a process for manufacture thereof, a process for making a catalyst-coated ion-conducting membrane for use in an electrochemical cell, such as a fuel cell or electrolyser, preferably a proton exchange membrane fuel cell or electrolyser, a catalyst-coated membrane manufactured by such a process, and a membrane electrode assembly comprising such a catalyst-coated ion-conducting membrane.

BACKGROUND OF THE INVENTION

A fuel cell is an electrochemical cell comprising two electrodes separated by an electrolyte. A fuel (e.g. hydrogen, an alcohol such as methanol or ethanol, or formic acid) is supplied to the anode and an oxidant (e.g. oxygen or air), is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell the ion-conducting membrane is proton-conducting, and protons, produced at the anode, are transported across the ion-conducting membrane to the cathode, where they combine with oxygen to form water.

A principal component of the proton exchange membrane fuel cell is the membrane electrode assembly (MEA), which is constructed of multiple layers. The central layer is the polymer ion-conducting membrane. On either face of the ion-conducting membrane there is an electrocatalyst layer containing an electrocatalyst designed for the specific electrolytic reaction. This sandwich of ion-conducting membrane and electrocatalyst layers provides an electrochemically active area. The electrocatalyst layers also generally comprise a proton-conducting material, such as a proton-conducting polymer, to aid transfer of protons from the anode electrocatalyst to the ion-conducting membrane and/or from the ion-conducting membrane to the cathode electrocatalyst. Adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

The MEA is generally sub-gasketed for use in a fuel cell. In a sub-gasketed MEA, sub-gaskets are present on one or both surfaces of the polymer ion-conducting membrane. The sub-gaskets contain apertures which define the active area of the MEA, and are attached to the ion-conducting membrane or electrocatalyst layers by use of an adhesive. These sub-gaskets are present to prevent gas leakage, and may contain further apertures away from the active area which are aligned in a fuel cell stack to facilitate porting of gases and liquids in the stack. A fuel cell stack can include a large number of sub-gasketed MEAs along with flow field plates which are carefully aligned to avoid, for example, gas leakage, hydrogen cross-over and performance deterioration. The overall power of the stack is proportional to the number of such assemblies in a stack. The performance of the stack depends in part on the integrity and various contacts and sealing interfaces within and between adjacent assemblies in the stack.

Conventional processes of manufacturing MEAs first require manufacturing a catalyst-coated ion-conducting membrane, which comprises the polymer ion-conducting membrane disposed between two electrocatalyst layers. This can be manufactured, for example, by a roll-to-roll process in which electrocatalyst layers are transferred to respective sides of an ion-conducting membrane by a decal transfer process. Sub-gaskets may be applied to the catalyst-coated ion-conducting membrane in a second roll-to-roll process. Gas diffusion layers are then combined with the sub-gasketed catalyst-coated ion-conducting membrane over the active areas, using an adhesive to bond the gas diffusion layers to the sub-gasketed catalyst-coated ion-conducting membrane. The adhesive may be a hot-melt glue, in which case the parts are bonded using heated plates, either in a heated press or a bespoke machine equivalent. This allows the glue to flow and bond the parts together. The adhesive may also be a pressure-sensitive adhesive.

In the decal transfer process described above, the electrocatalyst layers are provided in roll-good form on temporary carrier webs which are peeled away after the electrocatalyst layers have been laminated onto the polymer ion-conducting membrane. The electrocatalyst is generally deposited or coated onto the temporary carrier webs in the form of an ink or paste comprising catalyst particles dispersed with ionomeric binders and/or solvents.

As a skilled person will understand, the same principles as discussed above in connection with the manufacture of MEAs for fuel cells, in particular proton exchange membrane fuel cells, also apply to the manufacture of MEAs for electrolysers, in particular proton exchange membrane electrolysers.

SUMMARY OF THE INVENTION

The present invention is aimed at providing an improved process for producing catalyst coated ion-conducting membranes and for producing electrocatalyst layers, typically in roll-good form, for example by controlling the transfer of electrocatalyst onto the ion-conducting membrane and reducing wastage of the electrocatalyst.

Method of Manufacturing a Catalyst-Coated Membrane

According to a first aspect of the invention, there is provided a method of manufacturing a catalyst-coated ion-conducting membrane for an electrochemical cell, such as a fuel cell or electrolyser, preferably a proton exchange membrane fuel cell or electrolyser, the method comprising:

providing an ion-conducting membrane, an electrocatalyst layer, and a masking layer between the ion-conducting membrane and the electrocatalyst layer, wherein the masking layer comprises one or more aperture(s) to provide one or more exposed region(s) and one or more non-exposed region(s) of the electrocatalyst layer; and contacting the layers such that the one or more exposed region(s) of the electrocatalyst layer are transferred onto the ion-conducting membrane and the masking layer prevents the one or more non-exposed region(s) of the electrocatalyst layer from being transferred onto the ion-conducting membrane.

The first aspect of the invention provides a type of print-masking process for transferring electrocatalyst layers onto an ion-conducting membrane, such as a polymer electrolyte membrane, whereby the electrocatalyst layer is only transferred onto the ion-conducting membrane in an exposed region corresponding to an aperture in the masking layer. The electrocatalyst layer in a non-exposed region around the aperture is physically separated from the ion-conducting membrane by the masking layer during lamination, and so cannot transfer to the ion-conducting membrane.

For a conventional decal transfer process, electrocatalyst decals are generally produced by coating or depositing areas of electrocatalyst in the form of an ink or paste onto a carrier web. Such inks or pastes will have a tendency to flow, to some extent, and so controlling the exact dimensions of the electrocatalyst decal that is to be transferred onto the membrane during the decal transfer process is challenging. Consequently, an electrocatalyst decal may be slightly larger than necessary for the area of membrane that it is intended to cover, potentially causing problems with sealing the catalyst coated ion-conducting membrane. The print-masking process of the present invention, on the other hand, allows the dimensions of the electrocatalyst decal to be precisely controlled by the aperture in the masking layer, for example mitigating such sealing issues.

In some embodiments, the method further comprises an initial step of providing a masking layer without apertures and a step of cutting the aperture(s) into the masking layer, prior to the step of providing the masking layer between the ion-conducting membrane and the electrocatalyst layer. This allows the size and shape of the aperture(s), and hence the size and shape of the electrocatalyst decal, to be controlled and customised as needed. As understood be a skilled person, the size and shape of the aperture(s) will be determined by the intended for use of the catalyst coated ion-conducting membrane. For example, the aperture(s) may be irregular or regular in shape for example a quadrilateral, e.g. substantially rectangular, or the aperture(s) may be substantially circular or oval in shape. However, the size and shape of the aperture(s) is not limited. When more than one aperture is present, the apertures will preferably be the substantially the same shape and size.

In some embodiments, the step of contacting the layers includes pressing the layers together. In some embodiments, the layers are pressed together between a pair of rollers in a roll-to-roll lamination process. Alternatively, the layers may be pressed together by a flatbed press or similar apparatus, which may be preferred in embodiments where the layers are provided as discrete patches rather than as continuous webs.

In some embodiments, the rollers or flatbed press heat the layers to a temperature, for example in the range of and including 100 to 200° C. It will be understood that the exact lamination temperature will depend on the materials used in the electrocatalyst layer and the ion-conducting membrane. The lamination temperature should preferably be hot enough to allow the electrocatalyst layer and the ion-conducting membrane to bond to each other, but not so hot as to anneal or damage the layers.

In some embodiments, the method further comprises a step of removing the masking layer and non-exposed region(s) of the electrocatalyst layer from the ion-conducting membrane after the step of contacting the layers. Removal of the masking layer and non-exposed region(s) of the electrocatalyst layer may be facilitated by use of a vacuum, for example. Alternatively, in a roll-to-roll process, the removal may be achieved by use of a peel bar or idle roller.

In some embodiments, the non-exposed region(s) of the electrocatalyst layer are recovered and recycled for further use, thereby reducing wastage of the electrocatalyst material. For example, the recovered electrocatalyst may be reformulated into an ink or paste and made into a new electrocatalyst layer for use in the method of the first aspect.

In some embodiments, an electrocatalyst layer is provided on either side of the ion-conducting membrane and a masking layer is provided between the ion-conducting membrane and each respective electrocatalyst layer. In such embodiments, both sides of the ion-conducting membrane are coated with electrocatalyst simultaneously, thereby improving the efficiency of the method.

In some embodiments, the ion-conducting membrane is sandwiched between two layers of non-ion-conducting seal material such that it is a membrane-seal assembly, the membrane-seal assembly comprising one or more inner region(s) and one or more border region(s), the inner region(s) being devoid of non-ion-conducting seal material and being ion-conducting and the border region(s) comprising the non-ion-conducting seal material and being non-ion conducting. Accordingly, the inner region is the active area. Membrane-seal assemblies are aimed at reducing wastage of expensive membrane material by minimising the amount of membrane material that extends beyond the active area of the catalyst-coated ion-conducting membrane, as described in the applicant's previous application WO 2015/145129 A1, for example. It will be understood that the exposed region(s) of the electrocatalyst layer will substantially align with the inner region(s) and the masking layer will substantially align with the border region(s) such that the electrocatalyst layer is transferred onto the ion-conducting membrane and the masking layer prevents the one or more exposed region(s) of the electrocatalyst layer from being transferred onto the non-ion-conducting seal material. It is advantageous that the exposed region(s) of the electrocatalyst layer are larger in area than the area of the inner region(s) of the membrane-seal assembly, to compensate for the step height created by the non-ion-conducting seal material and ensure that the ion-conducting membrane is entirely covered upon transfer of the electrocatalyst layer and not left exposed. However, it is not desirable to transfer a substantial amount of electrocatalyst layer on to the non-ion-conducting seal material, so, typically, the area of the exposed region(s) is not so much larger as to facilitate transfer of the electrocatalyst layer on to the non-ion-conducting seal material. Typically, the exposed region(s) of the electrocatalyst layer is/are larger in area than the area of the inner region(s) of the membrane-seal assembly such that the exposed region(s) of the electrocatalyst layer create(s) a frame around the inner region(s) of the ion-conducting membrane having a width of up to 2 mm and typically no less than 1 mm.

In some embodiments, the ion-conducting membrane comprises a polymer electrolyte membrane. Types of polymer electrolyte membrane suitable for use in an electrochemical cell, such as a fuel cell or electrolyser, preferably a proton exchange membrane fuel cell or electrolyser, will be known to persons skilled in the art, and may include proton-conducting polymers or anion-conducting polymers, such as hydroxyl anion-conducting polymers. Examples of suitable proton-conducting polymers include perfluorosulphonic acid ionomers (e.g. Nafion® (E.I. DuPont de Nemours and Co.), Aciplex® (Asahi Kasei), Aquivion™ (Solvay Speciality Polymers), Flemion® (Asahi Glass Co.), or ionomers based on a sulphonated hydrocarbon such as those available from FuMA-Tech GmbH as the Fumapem® P, E or K series of products, JSR Corporation, Toyobo Corporation, and others. Examples of suitable anion-conducting polymers include A901 made by Tokuyama Corporation and Fumasep FAA from FuMA-Tech GmbH.

Similarly, types of electrocatalyst suitable for use in an electrochemical cell will be known to persons skilled in the art. For example, the electrocatalyst layer may be a cathode or anode electrocatalyst layer for a fuel cell or electrolyser, preferably a proton exchange membrane fuel cell or electrolyser. For example, the electrocatalyst may comprise a platinum group metal, i.e. ruthenium, rhodium, palladium, osmium, iridium or platinum, or an alloy of a platinum group metal.

The electrocatalyst layer preferably comprises an ion-conducting polymer, such as a proton-conducting ionomer, to improve the ion-conductivity of the layer. Accordingly, the ion-conducting material may include ionomers such as perfluorosulphonic acid materials (e.g. Nafion® (Chemours Company), Aciplex® (Asahi Kasei), Aquivion® (Solvay Specialty Polymer), Flemion® (Asahi Glass Co.) and per-fluorosulphonic acid ionomer material supplied by 3M®), or ionomers based on partially fluorinated or non-fluorinated hydrocarbons that are sulphonated or phosphonated polymers, such as those available from FuMA-Tech GmbH as the Fumapem® P, E or K series of products, JSR Corporation, Toyobo Corporation, and others. Suitably, the ionomer is a perfluorosulphonic acid, in particular the Nation® range available from Chemours company, especially Nafion® 1100EW, and the Aquivion® range available from Solvay, especially Solvay® 830EW.

In some embodiments, the masking layer comprises a polymer film. Preferably, the polymer film comprises a polymer that is thermally stable at the temperatures used to laminate the layers, to prevent contamination of the catalyst-coated ion-conducting membrane by the masking layer. Therefore, in some embodiments, the polymer film comprises a polymer which is thermally stable at temperatures in the range of and including 100 to 200° C. In some embodiments, the polymer film comprises polyetherimide, polyimide (PI), polyethersulphone (PES), fluorinated ethylene propylene (FEP), ethylene tetrafluoroethylene (ETFE), Viton®, polyethylene oxide (PEO), polyphenylene ether (PPE), polyethylene terephthalate (PET), polyethylene naphthalate (PEN), polyacrylonitrile (PAN), poly (p-phenylene sulphide) (PPS), polyolefins and silicones, preferably polyethylene naphthalate (PEN), polyethylenimine (PEI), polyether ether ketone (PEEK), polyphenylene sulfide (PPS), polytetrafluoroethylene (PTFE), or mixtures thereof. The masking layer can be printed onto the electrocatalyst layer, for example using inkjet or gravure printing. Any printable polymer that is thermally stable at the temperatures used to laminate the layers may be used. Printing of the masking layer enables an even higher level of accuracy in addition of the masking layer, including thickness profile. Suitably, polymers having precursors which do not require solvents to be formulated into a printable ink may be used, for example UV-cured polymers.

In some embodiments, the ion-conducting membrane, electrocatalyst layer and masking layer are each provided separately. For example, separate webs of ion-conducting membrane, electrocatalyst layer and masking layer may be fed in simultaneously between a pair of laminating rollers in a roll-to-roll process.

In other embodiments, the electrocatalyst layer and the masking layer are provided together as a pre-formed masked electrocatalyst component. Preferably, the masking layer is bonded to the electrocatalyst layer. In some such embodiments, the masking layer is bonded to the electrocatalyst layer by adhesive. Preferably, the adhesive is thermally stable at the temperatures used to laminate the layers, to prevent contamination of the catalyst-coated ion-conducting membrane by the adhesive. Therefore, in some embodiments, the adhesive is thermally stable at temperatures in the range of and including 100 to 200° C. In some embodiments, the adhesive comprises a pressure-sensitive adhesive, such as a silicone pressure-sensitive adhesive.

The pre-formed masked electrocatalyst component may be provided as a continuous web for a roll-to-roll process, or as discrete patches for an individual assembly process.

In some embodiments, the method further comprises a step of applying sub-gaskets around an active area of the catalyst-coated ion-conducting membrane. For example, the catalyst-coated ion-conducting membrane may be laminated between two half sub-gasket layers, which are bonded to the catalyst-coated ion-conducting membrane by adhesive. Sub-gaskets may be applied to the catalyst-coated ion-conducting membrane in a roll-to-roll lamination process.

According to a second aspect of the invention, there is provided a catalyst-coated ion-conducting membrane produced by the method of the first aspect.

According to a third aspect of the invention, there is provided a membrane electrode assembly comprising the catalyst-coated ion-conducting membrane of the second aspect. The membrane electrode assembly comprises a gas diffusion layer adjacent to each electrocatalyst layer.

According to a fourth aspect of the invention, there is provided a fuel cell, preferably a proton exchange membrane fuel cell, comprising the catalyst-coated ion-conducting membrane of the second aspect or the membrane electrode assembly of the third aspect.

According to a fifth aspect of the invention, there is provided an electrolyser, preferably a proton exchange membrane electrolyser, comprising the catalyst-coated ion-conducting membrane of the second aspect or the membrane electrode assembly of the third aspect.

Method of Producing a Masked Electrocatalyst Component

According to a sixth aspect of the invention, there is provided a method of producing a masked electrocatalyst component for use in manufacturing a catalyst-coated ion-conducting membrane. The method comprises:

providing an electrocatalyst layer;

providing a masking component comprising a masking layer, the masking layer comprising one or more aperture(s); and combining the masking layer with the electrocatalyst layer to form a masked electrocatalyst component.

Materials suitable for use in the electrocatalyst layer and the masking layer are as described in relation to the first aspect. For example, in some embodiments, the electrocatalyst layer comprises a platinum group metal or an alloy of a platinum group metal.

Preferably, the step of combining the masking layer with the electrocatalyst layer to form a masked electrocatalyst component is a step of bonding the masking layer to the electrocatalyst layer to form a masked electrocatalyst component. In some embodiments, the step of bonding the masking layer to the electrocatalyst layer is performed by a roll-to-roll lamination process, wherein the layers are pressed together between a pair of rollers.

In some embodiments, the electrocatalyst layer is supported on a temporary carrier layer. The carrier layer helps to protect the electrocatalyst layer and allows the masked electrocatalyst component to be wound up into a roll. The carrier layer may be removed prior to the masked electrocatalyst component being used in a process for manufacturing a catalyst-coated ion-conducting membrane. The temporary carrier may be formed from any suitable materials from which the electrocatalyst layer can be removed without damage and which are capable of retaining their mechanical strength/integrity at elevated temperatures, for example temperatures up to 200° C. Examples of suitable materials include fluoropolymers, such as polytetrafluoroethylene (PTFE), ethylene tetrafluoroethylene (ETFE), perfluoroalkoxy polymer (PFA), fluorinated ethylene propylene (FEP-a copolymer of hexafluoropropylene and tetrafluoroethylene); polyolefins, such as biaxially oriented polypropylene (BOPP); and polyethylene terephthalate (PET).

Preferably, the masking layer is bonded to the electrocatalyst layer by an adhesive. In such embodiments, the layers may or may not require any heating in order to bond the masking layer to the electrocatalyst layer. However, the masked electrocatalyst component may undergo heating during the process of manufacturing a catalyst-coated ion-conducting membrane, when the electrocatalyst layer is laminated to the ion-conducting membrane, for example in a method according to the first aspect. Therefore, in some embodiments, the adhesive is thermally stable at temperatures in the range of and including 100 to 200° C., to ensure that the adhesive does not contaminate the active area during lamination of a catalyst-coated ion-conducting membrane. In some embodiments, the adhesive comprises a pressure-sensitive adhesive, such as a silicone pressure-sensitive adhesive.

In some embodiments, the masking component further comprises a reinforcement layer for stabilising the masking layer during the step of bonding the masking layer to the electrocatalyst layer. The masking layer is typically around 10-30 μm in thickness, suitably 10-20 μm, preferably 10-15 μm, and so the reinforcement layer provides structural stability to prevent the masking layer—in particular the shape of the aperture—from deforming while it is brought into contact with the electrocatalyst layer.

The reinforcing film may comprise any material which is capable of retaining mechanical strength/integrity during the process. In some embodiments, the reinforcement layer comprises a reinforcing polymer film. Suitably, the material is not required to be stable at elevated temperatures, because the reinforcement is typically removed prior to the application of elevated temperatures. So, the material can be a low cost mechanically robust material. In some embodiments, the reinforcing polymer film comprises polyethylenimine (PEI), polyether ether ketone (PEEK), polyphenylene sulfide (PPS), polyimide (PI), polyethylene terephthalate (PET). PET has the benefit of being low cost and mechanically robust. In some embodiments, the reinforcement layer is bonded to the masking material by an adhesive. In embodiments where adhesive is used to bond the respective layers together, the adhesive used to bond the reinforcement layer to the masking layer should be weaker than the adhesive used to bond the masking layer to the electrocatalyst layer, to ensure that the masking layer does not separate from the electrocatalyst layer when the reinforcement layer is removed. Put another way the adhesive used to bond the reinforcement layer to the masking layer should be lower tack than the adhesive used to bond the masking layer to the electrocatalyst layer.

In some embodiments, the method further comprises a step of removing the reinforcement layer after the step of combining the masking layer with the electrocatalyst layer, which minimises the thickness of the masking component. The reinforcement layer may be removed by any suitable means, for example by a peel bar or idle roller in a continuous roll-to-roll process or by use of a vacuum.

In some embodiments, the electrocatalyst layer and the masking component are each provided in the form of continuous webs, the masking layer comprising a plurality of apertures along a length of the web. In some such embodiments, where the masked electrocatalyst component is produced in the form of a continuous web, the masked electrocatalyst component may be wound up into a roll or used directly in a further process for manufacturing a catalyst-coated ion-conducting membrane.

Alternatively, in some embodiments, the method further comprises a step of cutting the masked electrocatalyst component into discrete patches. In some such embodiments, the masked electrocatalyst component is cut between apertures of the masking layer, such that the masking layer in each patch comprises a single aperture. The patches may then be used to form individual catalyst-coated ion-conducting membranes in a non-roll-to-roll process.

In some embodiments, the method further comprises a step of cutting alignment features into the masked electrocatalyst component, for assisting with aligning the masked electrocatalyst component during a process of manufacturing a catalyst-coated ion-conducting membrane. During a process of manufacturing a catalyst-coated ion-conducting membrane, alignment features in the masked electrocatalyst component may be aligned with corresponding alignment features in the ion-conducting layer or membrane, allowing the electrocatalyst layer to be located precisely on the membrane.

According to a seventh aspect of the invention, there is provided a masked electrocatalyst component produced by the method of the sixth aspect. The masked electrocatalyst component of the seventh aspect may be used in the method of the first aspect.

Masked Electrocatalyst Component

According to an eighth aspect of the invention, there is provided a masked electrocatalyst component for use in manufacturing an electrochemical cell, such as a fuel cell or electrolyser, preferably a proton exchange membrane fuel cell or electrolyser. The masked electrocatalyst component comprises:

an electrocatalyst layer having a first surface and an oppositely disposed second surface;

a masking layer disposed on the first surface of the electrocatalyst layer, wherein the masking layer comprises one or more aperture(s), thereby providing one or more exposed region(s) and one or more non-exposed region(s) of the first surface of the electrocatalyst layer.

As discussed above in relation to the first aspect, the one or more exposed region(s) of the electrocatalyst layer correspond to the one or more aperture(s) in the masking layer, while the one or more non-exposed region(s) of the electrocatalyst layer remain covered under the masking layer around the aperture(s). Preferably, there is more than one aperture thereby providing more than one exposed region and more than one non-exposed region. The size and shape of the aperture(s) will be determined by the intended for use of the electrochemical cell. For example, the aperture(s) may be irregular or regular in shape for example a quadrilateral, e.g. substantially rectangular, or the aperture(s) may be substantially circular or oval in shape. However, the size and shape of the aperture(s) is not limited. When more than one aperture is present, the apertures will preferably be the substantially the same shape and size.

In some embodiments, the masked electrocatalyst component is in the form of a continuous web (also known as roll-good form), with the electrocatalyst layer and the masking layer each being a continuous web, and the masking layer comprising a plurality of apertures along a length of the web, thereby providing a plurality of exposed regions and non-exposed regions of the first surface of the electrocatalyst layer. The apertures may be spaced apart at regular intervals along the web. A masked electrocatalyst component in roll-good form may be wound onto a roll, thereby forming a roll-good assembly.

In other embodiments, the masked electrocatalyst component is in the form of a discrete patch, which may be used in the manufacture of an individual catalyst coated ion-conducting membrane. In some such embodiments, the masking layer comprises a single aperture, thereby providing one exposed region and one non-exposed region of the first surface of the electrocatalyst layer. This facilitates a single exposed region of electrocatalyst layer to be transferred onto a membrane during a process for manufacturing a catalyst-coated ion-conducting membrane.

In some embodiments, the masked electrocatalyst component further comprises a carrier layer disposed on the second surface of the electrocatalyst layer. The carrier layer helps to support and protect the electrocatalyst layer, and allows a continuous web of masked electrocatalyst component to be wound up into a roll. Examples of suitable carrier materials include fluoropolymers, such as polytetrafluoroethylene (PTFE), ethylene tetrafluoroethylene (ETFE), perfluoroalkoxy polymer (PFA), fluorinated ethylene propylene (FEP-a copolymer of hexafluoropropylene and tetrafluoroethylene); polyolefins, such as biaxially oriented polypropylene (BOPP); and polyethylene terephthalate (PET).

Materials suitable for use in the electrocatalyst layer and the masking layer are as described in relation to the first aspect. For example, in some embodiments, the electrocatalyst layer comprises a platinum group metal or an alloy of a platinum group metal.

In some embodiments, the masking layer is bonded to the electrocatalyst layer by an adhesive. Preferably, the adhesive is thermally stable at the lamination temperatures used in a process for manufacturing a catalyst-coated ion-conducting membrane, to prevent contamination of the catalyst-coated ion-conducting membrane by the adhesive. Therefore, in some embodiments, the adhesive is thermally stable at temperatures in the range of and including 100 to 200° C. In some embodiments, the adhesive comprises a pressure-sensitive adhesive, such as a silicone pressure-sensitive adhesive.

In some embodiments, the masked electrocatalyst component comprises alignment features for assisting with aligning the masked electrocatalyst component during a process of manufacturing a catalyst-coated ion-conducting membrane, for example in accordance with the first aspect of the invention. During a process of manufacturing a catalyst-coated ion-conducting membrane, alignment features in the masked electrocatalyst component may be aligned with corresponding alignment features in the ion-conducting membrane, allowing the electrocatalyst layer to be located precisely on the ion-conducting membrane. The alignment features may be, for example, an aperture cut into in the masking layer or the masking layer and electrocatalyst layer, such as a hole, notch, slot or groove. Alternatively, the alignment feature may be a visible mark made on the masking layer or masking layer and electrocatalyst layer, which can be detected by a vision system for alignment.

The masked electrocatalyst component of the eighth aspect may be used in the method of the first aspect.

It will be understood that any features described in relation to the first, second, third, sixth, seventh or eighth aspect may be freely combined with any other aspect as appropriate.

BRIEF DESCRIPTION OF THE DRAWINGS

Embodiments of the invention will now be described in more detail with reference to the following drawings, which are illustrative and not limiting of the invention.

DETAILED DESCRIPTION OF EMBODIMENTS OF THE INVENTION

Figures 1, 2:
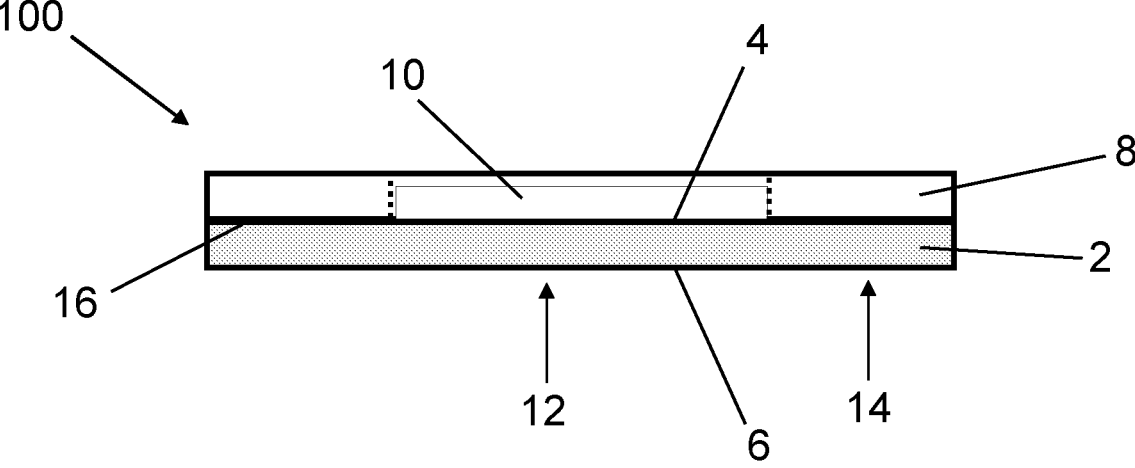
FIG. 1 is a perspective view of a masked electrocatalyst component in accordance with an embodiment of the invention.
FIG. 2 is a cross-section view of the masked electrocatalyst component shown in FIG. 1.

FIGS. 1 and 2 illustrate a masked electrocatalyst component 100 in accordance with an embodiment of the invention. In the illustrated embodiment, the masked electrocatalyst component 100 is in the form of a discrete patch, for use in manufacturing an individual catalyst-coated ion-conducting membrane.

The masked electrocatalyst component 100 comprises an electrocatalyst layer 2 having a first surface 4 and an oppositely disposed second surface 6. The masked electrocatalyst component 100 further comprises a masking layer 8 disposed on the first surface 4 of the electrocatalyst layer 2. The masking layer 8 comprises an aperture 10 which exposes a region of the electrocatalyst layer 2 disposed underneath the masking layer 8. The region of the electrocatalyst layer 2 corresponding to the aperture 10 can be referred to as an exposed region 12, while the region of the electrocatalyst layer 2 which remains under the masking layer 8 around the aperture 10 can be referred to as a non-exposed region 14. In the illustrated embodiment, the masking layer 8 is bonded to the electrocatalyst layer 2 by a layer of adhesive 16. This is preferred because it facilitates easier handling of the masked electrocatalyst component.

Figure 3:
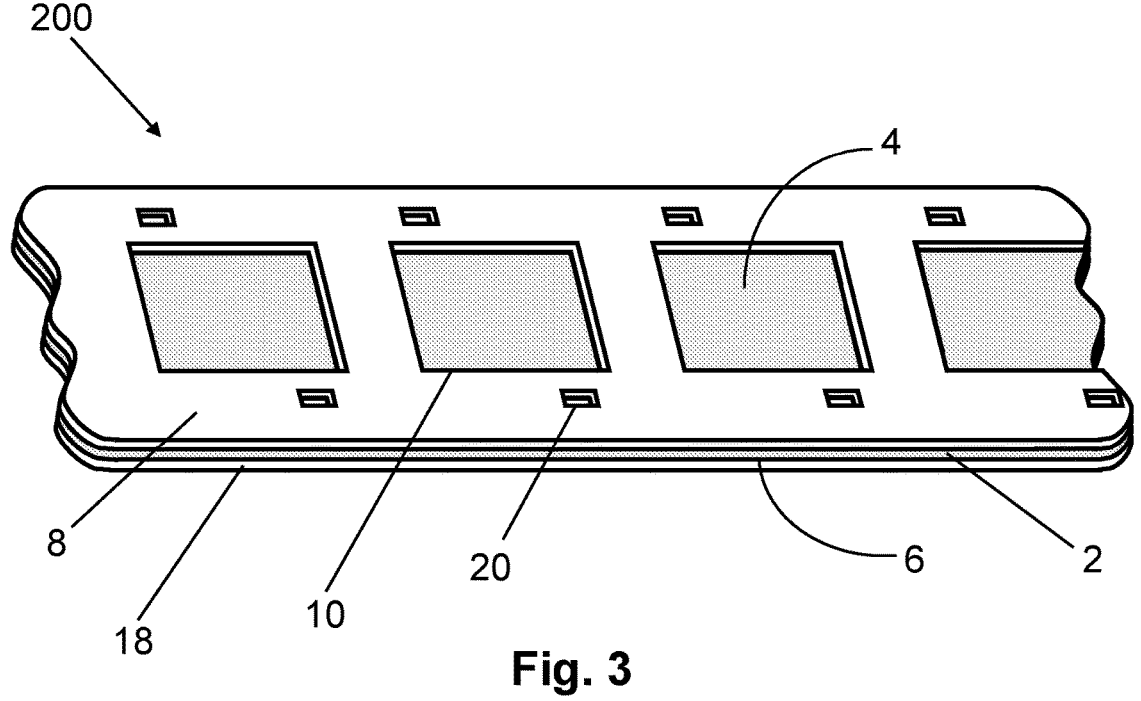
FIG. 3 is a perspective view of a masked electrocatalyst component in accordance with an embodiment of the invention.
Figure 4:
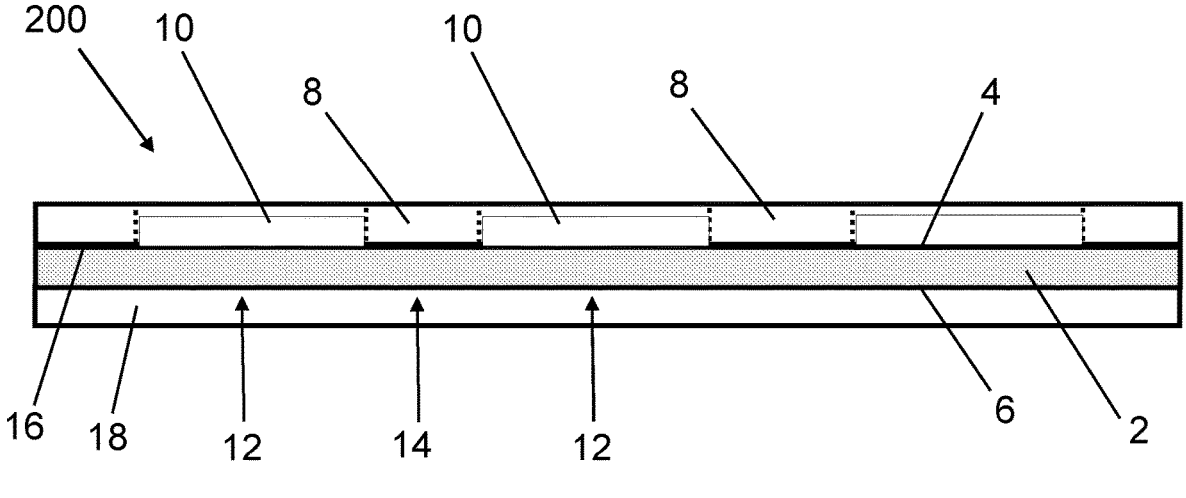
FIG. 4 is a cross-section view of the masked electrocatalyst component shown in FIG. 3.

FIGS. 3 and 4 illustrate a masked electrocatalyst component 200 in accordance with another embodiment of the invention, which is in the form of a continuous web (which can be used in a roll-good) rather than a discrete patch. The same reference numbers are used for components which are common between the embodiment shown in FIGS. 1 and 2 and the embodiment shown in FIGS. 3 and 4.

In the illustrated embodiment, a carrier layer 18 is provided adjacent to the second surface 6 of the electrocatalyst layer 2, which helps to support and protect the electrocatalyst layer 2. The masking layer 8 is provided as a continuous web comprising a plurality of apertures 10, thereby forming a plurality of exposed regions 12 of the electrocatalyst layer 2.

In the illustrated embodiment, alignment features 20 are provided to assist in aligning the masked electrocatalyst component 200 with an ion-conducting membrane during manufacture of a catalyst-coated ion-conducting membrane. The alignment features 20 are notches cut into the masked electrocatalyst component 200. Alignment features 20 may also assist in aligning with a second masked electrocatalyst component if two such components are simultaneously applied to an ion-conducting membrane.

Figure 5:
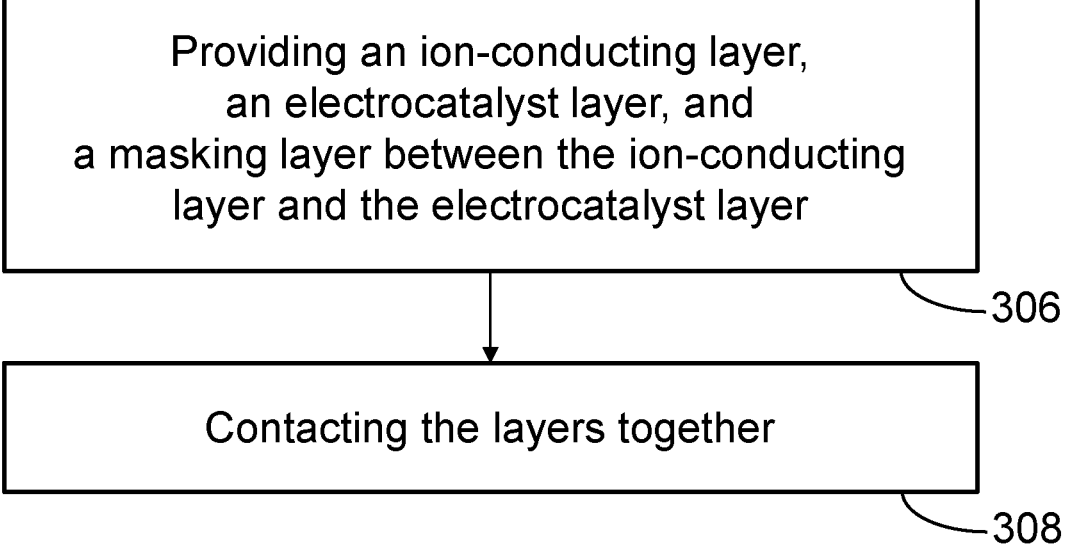
FIG. 5 is a process flow diagram illustrating a method for manufacturing a catalyst-coated ion-conducting membrane in accordance with an embodiment of the invention.

FIG. 5 illustrates a flow diagram of a method for manufacturing a catalyst-coated ion-conducting membrane in accordance with an embodiment of the invention. In a first step, an ion-conducting membrane, an electrocatalyst layer, and a masking layer between the ion-conducting membrane and the electrocatalyst layer are provided 306. The masking layer comprises one or more aperture(s) to provide one or more exposed region(s) and one or more non-exposed region(s) of the electrocatalyst layer. In a second step, the layers are contacted 308, such that the one or more exposed region(s) of the electrocatalyst layer are transferred onto the ion-conducting membrane and the masking layer prevents the one or more non-exposed region(s) of the electrocatalyst layer from being transferred onto the ion-conducting membrane.

An electrocatalyst decal corresponding to an aperture in the masking layer is therefore transferred onto the ion-conducting membrane, which allows the exact size and shape of the electrocatalyst decal to be precisely controlled by modifying the size and shape of the aperture in the masking layer. The result is a catalyst-coated ion-conducting membrane with a very precisely defined electrocatalyst layer, which does not extend an undesirable distance beyond the intended active area.

Preferably, the step of contacting the layers 308 includes pressing the layers together. The layers may be pressed together between a pair of rollers in a roll-to-roll lamination process, or between two plates of a flatbed press. The rollers or flatbed press may heat the layers to a temperature in the range of and including 100 to 200° C., to assist in adhering the electrocatalyst decal to the ion-conducting membrane without the need to use a separate adhesive.

Figure 6:
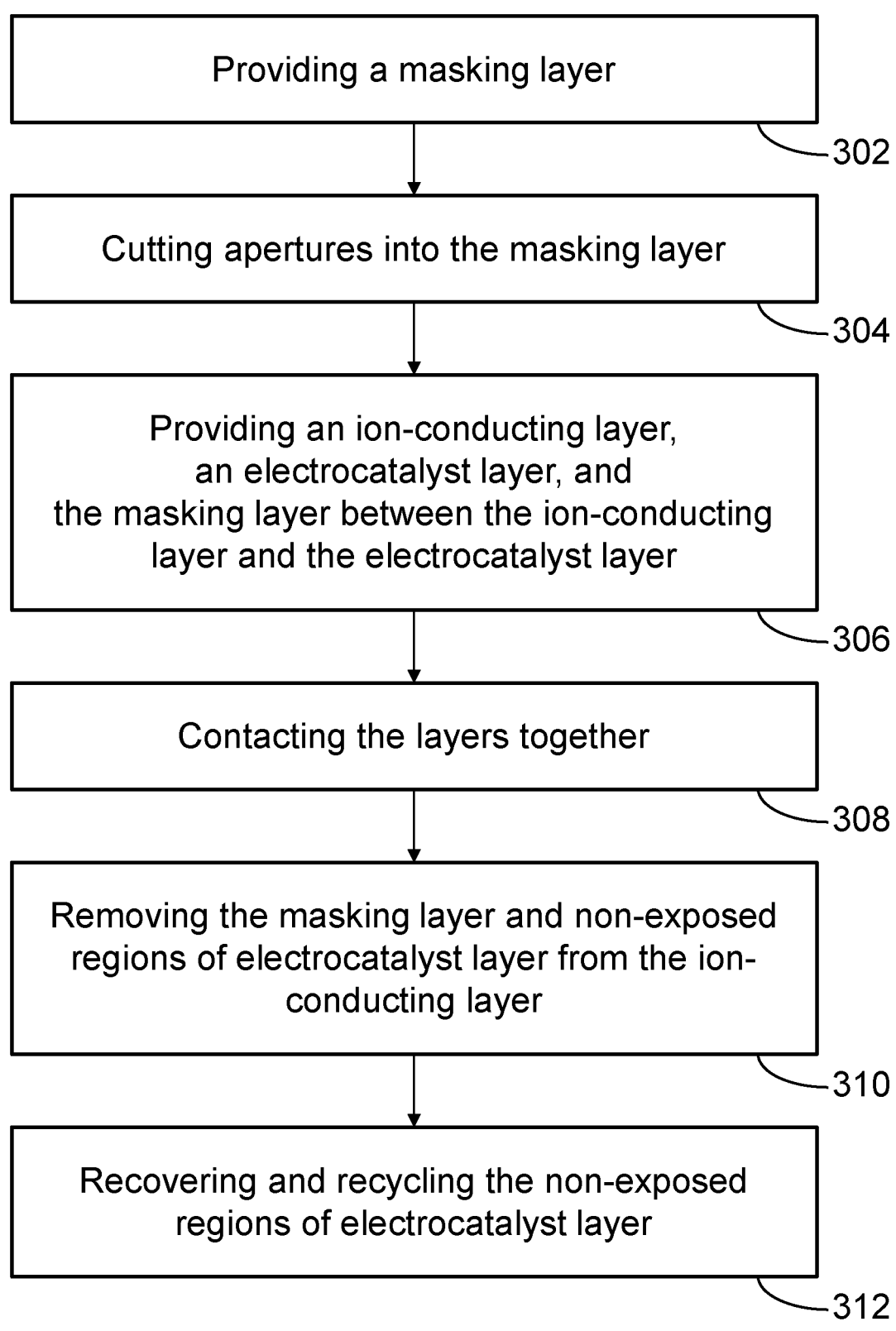
FIG. 6 is a process flow diagram illustrating a method for manufacturing a catalyst-coated ion-conducting membrane in accordance with an embodiment of the invention.

FIG. 6 illustrates a flow diagram of a method for manufacturing a catalyst-coated ion-conducting membrane in accordance with another embodiment of the invention. A masking layer is firstly provided 302, and apertures are cut 304 into the masking layer. The size and shape of the apertures can be tailored to the requirements of the electrocatalyst layer(s) in a catalyst-coated ion-conducting membrane.

Next, an ion-conducting membrane, an electrocatalyst layer and the masking layer are provided 306, with the masking layer being provided between the ion-conducting membrane and the electrocatalyst layer. The one or more aperture(s) in the masking layer provide one or more exposed region(s) and one or more non-exposed region(s) of the electrocatalyst layer.

The layers are then contacted 308, such that the one or more exposed region(s) of the electrocatalyst layer are transferred onto the ion-conducting membrane and the masking layer prevents the one or more non-exposed region(s) of the electrocatalyst layer from being transferred onto the ion-conducting membrane. As mentioned previously, contacting the layers 308 may include pressing the layers together. The layers may be pressed together between a pair of rollers in a roll-to-roll lamination process, or between two plates of a flatbed press, and the rollers or flatbed press may heat the layers to a temperature in the range of and including 100 to 200° C.

In a subsequent step, the masking layer and non-exposed region(s) of the electrocatalyst layer is/are removed 310 from the ion-conducting membrane, leaving only the electrocatalyst decal on the ion-conducting layer. The non-exposed region(s) of the electrocatalyst layer can then be recovered and recycled 312 for further use, for example in a new electrocatalyst layer to be provided 306 at the start of the process.

Figure 7:
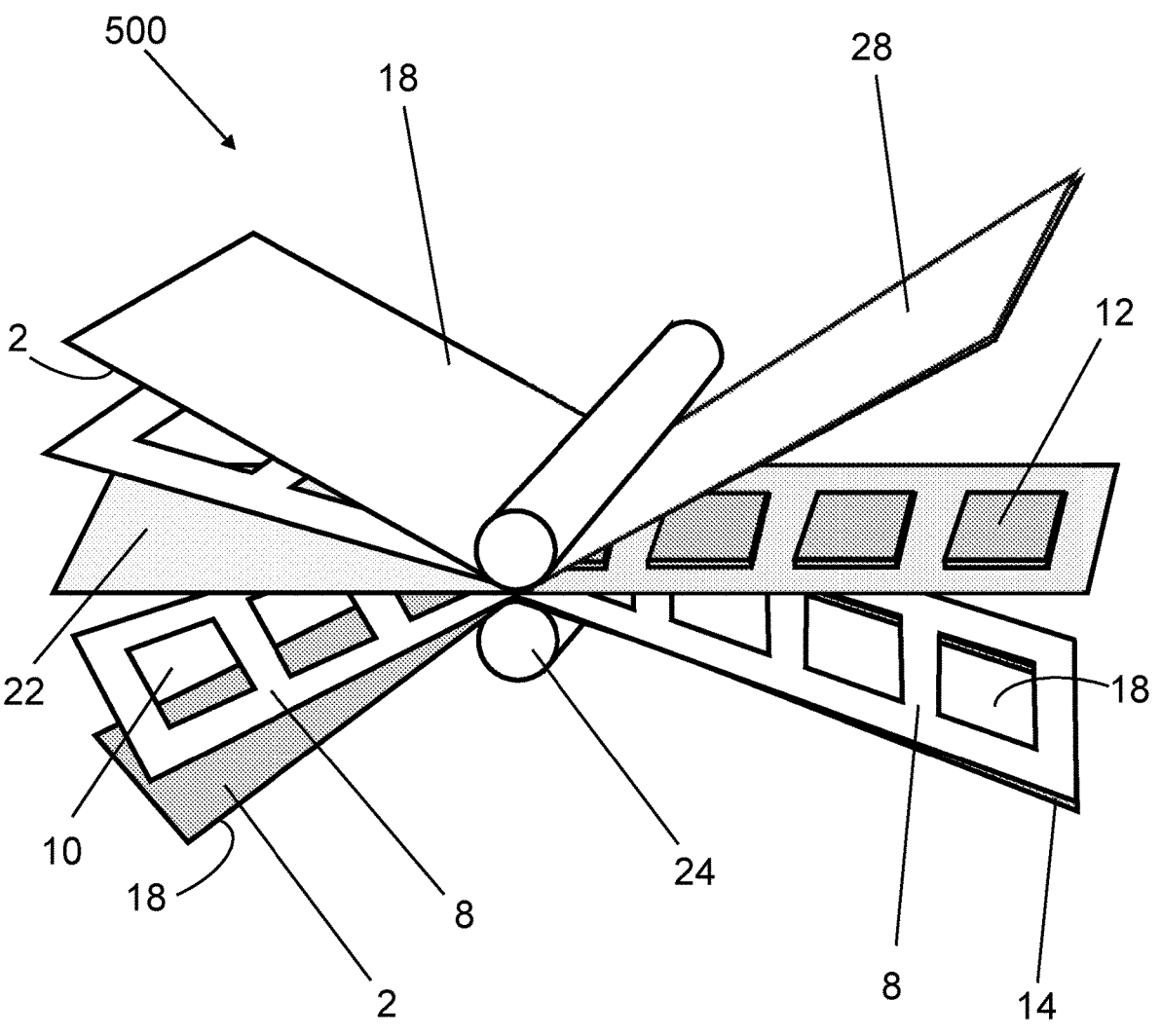
FIG. 7 illustrates a catalyst-coated ion-conducting membrane being manufactured by a roll-to-roll process in accordance with an aspect of the invention.

As shown in FIG. 7, which illustrates a roll-to-roll process for manufacturing a catalyst-coated ion-conducting membrane in accordance with the present invention, an electrocatalyst layer 2 (shown disposed on a carrier layer or backing liner 18) may be provided on either side of an ion-conducting membrane 22, with a masking layer 8 disposed between the ion-conducting membrane 22 and each respective electrocatalyst layer 2.

The layers are fed in simultaneously between a pair of laminating rollers 24, which laminate the layers and transfer the exposed regions 12 of electrocatalyst layer 2 (corresponding to the apertures 10 of the masking layer 8) onto the ion-conducting membrane 22. The masking layer 8 and non-exposed regions 14 of the electrocatalyst layer 2 (together with the backing liner 18) are then peeled away from the ion-conducting membrane 22, leaving the exposed region 12 of electrocatalyst layer on the ion-conducting membrane 22 as an electrocatalyst decal. In the roll-to-roll process shown, the respective layers are each provided as continuous webs, so that the resulting catalyst-coated ion-conducting membrane is also produced in the form of a continuous web, i.e. in roll-good form. The catalyst-coated ion-conducting membrane can then either be used directly in a roll-to-roll process for manufacturing a membrane electrode assembly, or wound onto a roll for future use.

The process of the present invention can therefore provide a highly efficient process for manufacturing catalyst-coated ion-conducting membranes in roll-good form with precisely defined electrocatalyst decals.

Although the masking layer 8 and the electrocatalyst layer 2 are shown as separate layers which are fed in between the rollers 24, they may also be provided bonded together as a pre-formed masked electrocatalyst component.

Figure 8:
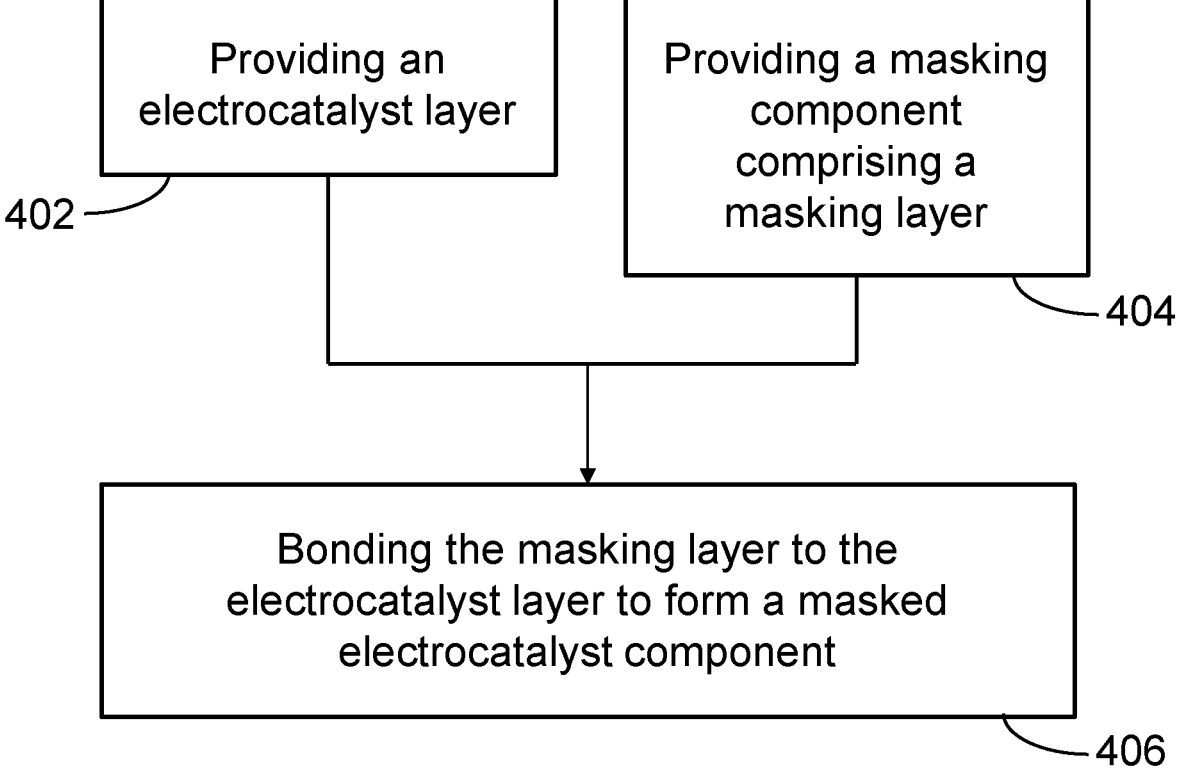
FIG. 8 is a process flow diagram illustrating a method for manufacturing a masked electrocatalyst component in accordance with an embodiment of the invention.

FIG. 8 illustrates a flow diagram of a method for manufacturing a masked electrocatalyst component in accordance with an embodiment of the invention. Firstly, an electrocatalyst layer is provided 402 and a masking component comprising a masking layer is provided 404. The masking layer is then bonded 406 to the electrocatalyst layer to form a masked electrocatalyst component. Bonding is not required, but is preferred because it facilitates easier handling of the masked electrocatalyst material. The masking layer and the electrocatalyst layer may be bonded by, for example, an adhesive. The adhesive should preferably be

13 | 14 thermally stable at the lamination temperatures used in a process for manufacturing a catalyst-coated ion-conducting membrane. For example, the adhesive may be a silicone pressure-sensitive adhesive.

Figure 9:
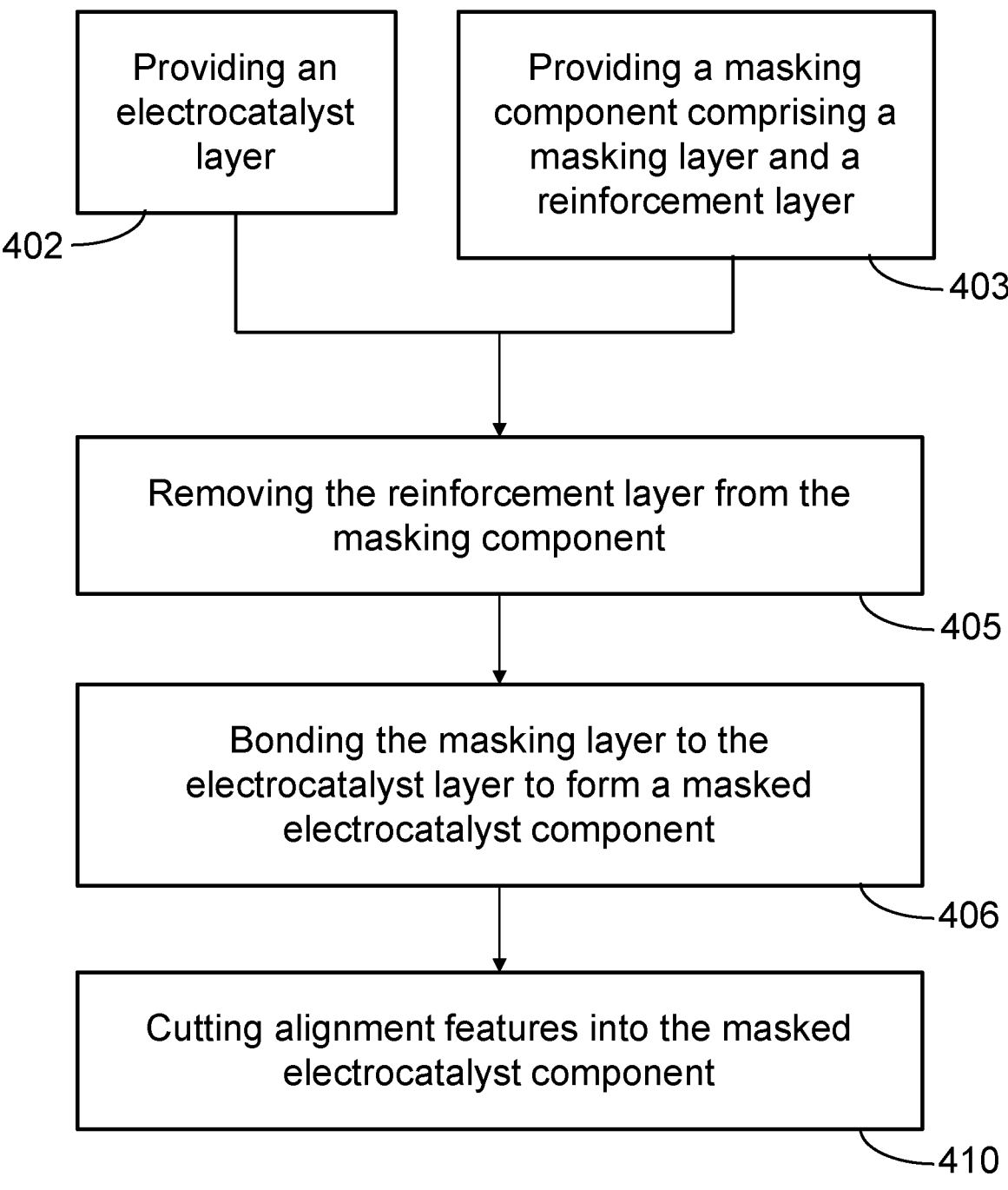
FIG. 9 is a process flow diagram illustrating a method for manufacturing a masked electrocatalyst compound in accordance with an embodiment of the invention.

FIG. 9 illustrates a flow diagram of a method for manufacturing a masked electrocatalyst component in accordance with another embodiment of the invention. An electrocatalyst layer is provided 402 and a masking component comprising a masking layer and a reinforcement layer is provided 403. The reinforcement layer helps to stabilise the masking layer and keep its shape while being brought into contact with the electrocatalyst layer. Before bonding 406 the masking layer to the electrocatalyst layer, the reinforcement layer can be removed 405 from the masking component. Alignment features may then be cut 410 into the masked electrocatalyst component.

Removing the reinforcement layer is not essential, but helps to minimise the thickness of the masking component during a process for manufacturing a catalyst-coated ion-conducting membrane. Removing the reinforcement layer also means that the reinforcement layer can be made from a polymer which does not need to be thermally stable at the lamination temperatures used during a process for manufacturing a catalyst-coated ion-conducting membrane.

Figure 10A:
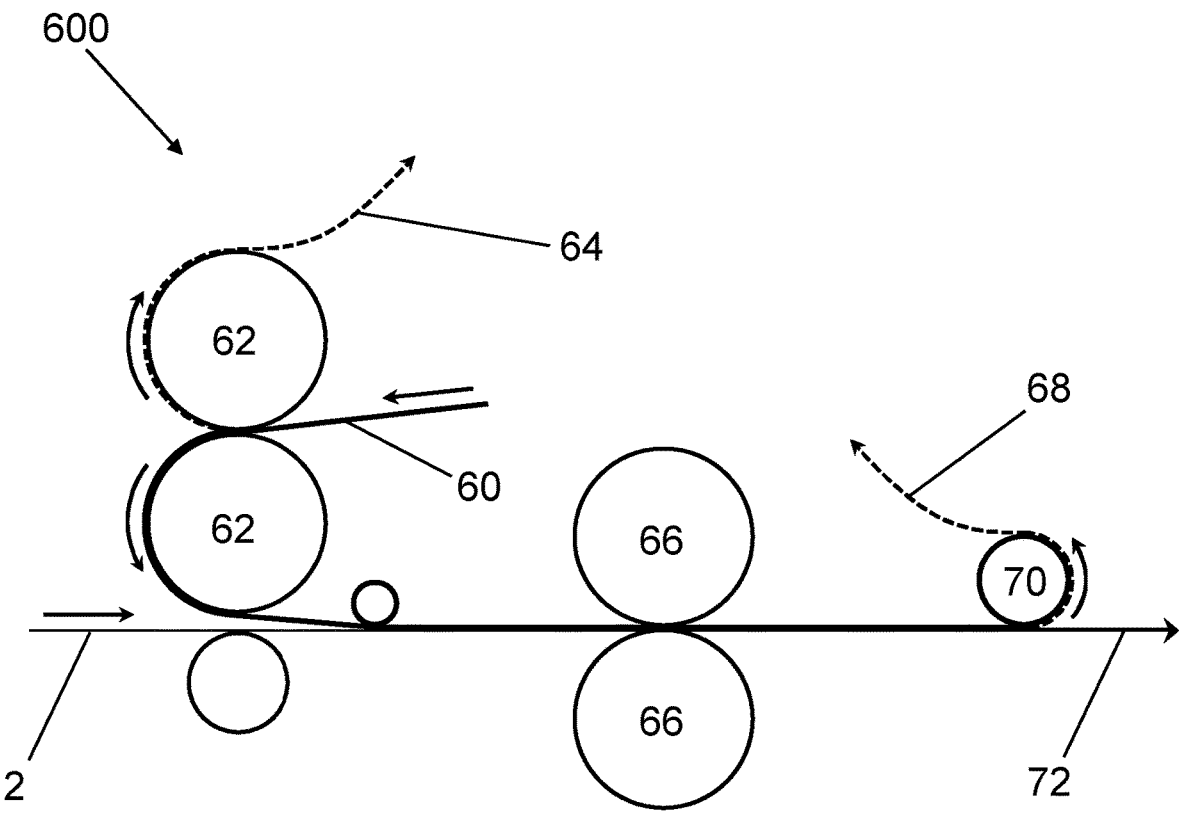
FIGS. 10A and 10B illustrate subsystems of a roll-to-roll based system for manufacturing a masked electrocatalyst component in accordance with a method of the present invention.
Figure 10B:
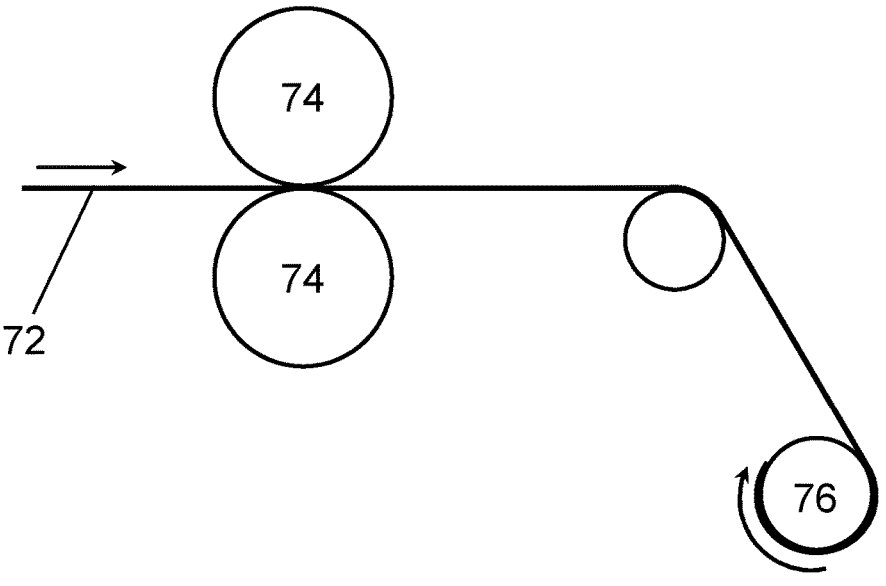

FIGS. 10A and 10B illustrate model subsystems of a roll-to-roll based system for manufacturing a masked electrocatalyst component in accordance with an embodiment of the invention.

A masking component 60 comprising a masking layer and a reinforcement layer is fed into a rotary die cutter 62, which cuts apertures into the masking layer. A protective layer 64 covering pre-applied adhesive on the masking layer is also removed at this point. The masking component, now comprising apertures in the masking layer, is laid gently on the electrocatalyst layer 2. The masking component and electrocatalyst layer are laminated together between rollers 66. The reinforcement layer 68 is then peeled away from the masking layer by peel bar 70, leaving a masked electrocatalyst component 72 comprising the masking layer and the electrocatalyst layer.

Alignment features may be cut into the masked electrocatalyst component by a rotary die cutter 74. The masked catalyst component may then be wound onto a roll 76 for later use, if not fed directly into a process for manufacturing a catalyst-coated ion-conducting membrane.

It will be understood that the drawings used herein to illustrate embodiments of the invention are not made accurately to scale and are provided purely to aid in understanding the invention.

The invention claimed is:

1. A method of manufacturing a catalyst-coated ion-conducting membrane for an electrochemical cell, the method comprising:
providing an ion-conducting membrane, an electrocatalyst layer, and a masking layer between the ion-conducting membrane and the electrocatalyst layer, wherein the masking layer comprises one or more aperture(s) to provide one or more exposed region(s) and one or more non-exposed region(s) of the electrocatalyst layer; and
contacting the layers such that the one or more exposed region(s) of the electrocatalyst layer are transferred onto the ion-conducting membrane and the masking layer prevents the one or more non-exposed region(s) of the electrocatalyst layer from being transferred onto the ion-conducting membrane;

wherein the electrocatalyst layer and the masking layer are provided together as a pre-formed masked electrocatalyst component, with the masking layer bonded to the electrocatalyst layer.

2. The method of claim 1, further comprising an initial step of providing a masking layer without apertures and a step of cutting the aperture(s) into the masking layer, prior to the step of providing the masking layer between the ion-conducting membrane and the electrocatalyst layer.

3. The method of claim 1, wherein the step of contacting the layers includes pressing the layers together.

4. The method of claim 3, wherein the layers are pressed together between a pair of rollers in a roll-to-roll lamination process.

5. The method of claim 3, wherein the layers are pressed together by a flatbed press.

6. The method of claim 4, wherein the rollers heat the layers to a temperature in the range of and including 100 to 200° C.

7. The method of claim 1, further comprising a step of removing the masking layer and non-exposed region(s) of the electrocatalyst layer from the ion-conducting membrane after the step of contacting the layers.

8. The method of claim 7, wherein the non-exposed region(s) of the electrocatalyst layer is/are recovered and recycled for further use.

9. The method of claim 1, wherein an electrocatalyst layer is provided on either side of the ion-conducting membrane and a masking layer is provided between the ion-conducting membrane and each respective electrocatalyst layer.

10. The method of claim 1, wherein the ion-conducting membrane is sandwiched between two layers of non-ion-conducting seal material such that it is a membrane-seal assembly, the membrane-seal assembly comprising one or more inner region(s) and one or more border region(s), the inner region(s) being devoid of non-ion-conducting seal material and being ion-conducting and the border region(s) comprising the non-ion-conducting seal material and being non-ion conducting.

11. The method of claim 1, wherein the ion-conducting membrane comprises a polymer electrolyte membrane.

12. The method of claim 1, further comprising a step of applying sub-gaskets around an active area of the catalyst-coated ion-conducting membrane.

13. A method of producing a masked electrocatalyst component for use in manufacturing a catalyst-coated ion-conducting membrane, the method comprising:
providing an electrocatalyst layer;
providing a masking component comprising a masking layer, the masking layer comprising one or more aperture(s); and
combining the masking layer with the electrocatalyst layer to form a masked electrocatalyst component further comprising a step of cutting alignment features into the masked electrocatalyst component, for assisting with aligning the masked electrocatalyst component during a process of manufacturing a catalyst-coated ion-conducting membrane.

14. The method of claim 13, wherein the step of combining the masking layer with the electrocatalyst layer to form a masked electrocatalyst component is a step of bonding the masking layer to the electrocatalyst layer to form a masked electrocatalyst component.

15. The method of claim 14, wherein the step of bonding the masking layer to the electrocatalyst layer is performed by a roll-to-roll lamination process, wherein the layers are pressed together between a pair of rollers.

16. The method of claim 14, wherein the masking layer is bonded to the electrocatalyst layer by an adhesive.

17. The method of claim 13, wherein the masking component further comprises a reinforcement layer for stabilising the masking layer during the step of combining the masking layer with the electrocatalyst layer.

18. The method of claim 17, wherein the reinforcement layer comprises a reinforcing polymer film.

19. The method of claim 17, wherein the reinforcement layer is bonded to the masking layer by an adhesive.

20. The method of claim 17, further comprising a step of removing the reinforcement layer after the step of bonding the masking layer to the electrocatalyst layer.

21. The method of claim 13, wherein the electrocatalyst layer and the masking component are each provided in the form of continuous webs, with the masking layer comprising a plurality of apertures along a length of the web.

22. The method of claim 21, wherein the masked electrocatalyst component is produced in the form of a continuous web, further comprising a step of cutting the masked electrocatalyst component into discrete patches.

23. The method of claim 22, wherein the masked electrocatalyst component is cut between apertures of the masking layer, such that the masking layer in each patch comprises a single aperture.

24. A masked electrocatalyst component for use in manufacturing an electrochemical cell, the masked electrocatalyst component comprising:

an electrocatalyst layer having a first surface and an oppositely disposed second surface;

a masking layer disposed on the first surface of the electrocatalyst layer, wherein the masking layer comprises one or more aperture(s), thereby providing one or more exposed region(s) and one or more non-exposed region(s) of the first surface of the electrocatalyst layer, wherein the masking layer is bonded to the electrocatalyst layer by an adhesive.

25. The masked electrocatalyst component of claim 24, wherein the masked electrocatalyst component is in roll-good form, with the electrocatalyst layer and the masking layer each being a continuous web, the masking layer comprising a plurality of apertures along a length of the web.

26. The masked electrocatalyst component of claim 24, wherein the masked electrocatalyst component is in the form of a discrete patch.

27. The masked electrocatalyst component of claim 26, wherein the masking layer comprises a single aperture.

28. The masked electrocatalyst component of claim 24, further comprising a carrier layer disposed on the second surface of the electrocatalyst layer.

29. The masked electrocatalyst component of claim 24, wherein the electrocatalyst layer comprises a platinum group metal or an alloy of a platinum group metal.

30. The masked electrocatalyst component of claim 24, wherein the masking layer comprises a polymer film.

31. The masked electrocatalyst component of claim 30, wherein the polymer film comprises a polymer which is thermally stable at temperatures in the range of and including 100 to 200° C.

32. The masked electrocatalyst component of claim 30, wherein the polymer film comprises polyethylene naphthalate (PEN), polyethylenimine (PEI), polyether ether ketone (PEEK), polyphenylene sulfide (PPS), polyimide (PI), polytetrafluoroethylene (PTFE), or mixtures thereof.

33. The masked electrocatalyst component of claim 24, wherein the adhesive is thermally stable at temperatures in the range of and including 100 to 200° C.

34. The masked electrocatalyst component of claim 24, wherein the adhesive comprises a silicone pressure-sensitive adhesive.

* * * * *